United States Patent
Moldoveanu et al.

(10) Patent No.: US 12,474,503 B1
(45) Date of Patent: Nov. 18, 2025

(54) SUBSURFACE EXPLORATION INSTRUMENTS WITH INTEGRATED MUON DETECTORS

(71) Applicant: Maurice Nessim, Houston, TX (US)

(72) Inventors: Nicolae Moldoveanu, Nice (FR); Maurice Nessim, Houston, TX (US)

(73) Assignee: Nessim Maurice, Houston, TX (US)

( * ) Notice: Subject to any disclaimer, the term of this patent is extended or adjusted under 35 U.S.C. 154(b) by 0 days.

(21) Appl. No.: 18/907,051

(22) Filed: Oct. 4, 2024

(51) Int. Cl.
*G01V 11/00* (2006.01)
*G01T 1/20* (2006.01)
*G01V 1/24* (2006.01)
*G01V 5/00* (2024.01)

(52) U.S. Cl.
CPC .............. *G01V 11/002* (2013.01); *G01T 1/20* (2013.01); *G01V 1/24* (2013.01); *G01V 5/00* (2013.01)

(58) Field of Classification Search
CPC ........... G01V 11/002; G01V 5/00; G01T 1/20
See application file for complete search history.

(56) References Cited

U.S. PATENT DOCUMENTS

| 6,961,284 | B2 | 11/2005 | Moldoveanu | |
|---|---|---|---|---|
| 2008/0128604 | A1* | 6/2008 | Bryman | G01T 1/203 250/266 |

FOREIGN PATENT DOCUMENTS

| GB | 2586695 | A | * | 3/2021 | ............ | G01N 23/04 |
|---|---|---|---|---|---|---|
| WO | WO-2024050630 | A1 | * | 3/2024 | ............ | E21C 41/16 |

OTHER PUBLICATIONS

Le Gonidec et al., "Abrupt changes of hydrothermal activity in a lava dome detected by combined seismic and muon monitoring", Scientific Reports | (2019) 9:3079 | https://doi.org/10.1038/s41598-019-39606-3. (Year: 2019).*
Tanaka, Hiroyuki K. M., "Muometric positioning system (μPS) with cosmic muons as a new underwater and underground positioning technique", Nature Research: Scientific Reports | (2020) 10:18896 | https://doi.org/10.1038/s41598-020-75843-7 (Year: 2020).*
Zhang et al., "3D seismic survey design by maximizing the spectral gap", Conference: International Meeting for Applied Geoscience & Energy, Dec. 2023. (Year: 2023).*
Mellors et al. "Muons and seismic: a dynamic duo for the shallow subsurface?", FastTIMES: Dec. 2016 (Year: 2017).*
Moldoveanu, Nick et al., Vertical Source Array in Marine Seismic Exploration, pp. 1-6, SEG 2005 Expanded Abstracts.
Schouten, Douglas et al., Cosmic-ray Muon Tomography: New Developments for Near-mine Exploration and Geotechnical Applications, pp. 1-4, 2024.

(Continued)

*Primary Examiner* — Casey Bryant
(74) *Attorney, Agent, or Firm* — HUNTON ANDREWS KURTH LLP

(57) ABSTRACT

The present application pertains to systems and methods for subsurface exploration. An exemplary method comprises employing a muon detector array comprising a first muon detector and a second muon detector. The muon detector array is configured to detect muons from above the array, to detect muons below the array, and to detect muons substantially horizontally to the array. One or more seismic sensors are also employed. Muon tomography is employed with the muon detector array and seismic imaging is employed with the one or more seismic sensors to image a subsurface.

31 Claims, 8 Drawing Sheets

(56) References Cited

OTHER PUBLICATIONS

Tanaka, Hiroyuli K.M. et al., Cosmic-ray muon imaging of magma in a conduit: Degassing process of Satsuma-Iwojima Volcano, Japan, Geophysical Research Letters, vol. 36, L01304, doi:10.1029/2008GL036451, 2009.

Morishima, Kunihiro et al., Discovery of a big void in Khufu's Pyramid by observation of cosmic-ray muons, pp. 1-14, Nature • Dec. 2017.

Lechmann, Alessandro et al., Muon Tomography in Geoscientific Research—A guide to best Practice, Earth-Science Reviews. vol. 222, No. 103842, 2021.

Lopez, Oscar et al., Spectral Gap-Based Seismic Survey Design, IEEE Transactions on Geo science and Remote Sensing, pp. 1-9, Jan. 20, 2023.

Giammanco, Andrea et al., Cosmic Rays for Imaging Cultural Heritage object, arXiv:2405.10417v1 [physics.soc-ph] pp. 1-28, May 16, 2024.

Moldoveanu, Nick, "Vertical Source Array in Marine Seismic Exploration", SEG 2000 Expanded Abstracts, 2005, 5 pages.

Moldoveanu, et al., "Over/under towed streamer acquisition: A method to extend seismic bandwidth to both higher and lower frequencies", The Leading Edge, Jan. 2007, 14 pages.

\* cited by examiner $$\cos(a) = \frac{BC}{AC}$$

A=arrival angle
BC and AC are determined based
on time of flight measured by detectors

SUBSURFACE EXPLORATION INSTRUMENTS WITH INTEGRATED MUON DETECTORS

FIELD OF THE DISCLOSURE

The seismic instruments used for subsurface exploration could contain geophone and/or hydrophones sensors. Geophones are sensors that detect ground vibrations, and they convert ground movement (particle velocity) into electrical signals. Hydrophones measure the pressure changes associated with seismic waves traveling through water, and convert these into electrical signals.

The present disclosure relates to a new type of seismic instrument that includes a muon detector in addition to the typical detectors that are used in seismic exploration. This will allow performing muon tomography, a geophysical imaging technique of the subsurface that uses cosmic-ray muons, simultaneously with seismic exploration. A muon is a subatomic particle, like an electron, but with much greater mass, which is produced from interactions of the cosmic rays with the Earth's atmosphere. The muon could penetrate deep into the subsurface, interact with the subsurface rocks, and generate secondary muons that could propagate back to the surface where could be recorded by muon detectors. The main information about the subsurface that can be obtained from the secondary muons recorded at the surface is primarily related to the density of the rocks and attenuation of the muons as they pass through different materials.

BACKGROUND AND SUMMARY

In seismic exploration for oil discovery or for new energy studies (e.g., geothermal studies or Carbon Capture and Sequestration (CCS)), ocean bottom nodes and/or land nodes are used as sensors.

Ocean Bottom Node (OBN) is a type of seismic equipment used primarily for underwater geophysical studies, particularly in the oil and gas industry. These nodes are deployed on the seafloor and are used to acquire seismic data in complex offshore environments.

Ocean Bottom Nodes typically incorporate the following components:
1. Seismic sensors: hydrophone and three component geophones.
2. Data storage: OBNs contain onboard data storage to record the seismic data they collect. This data is later retrieved when the nodes are recovered from the ocean floor.
3. Battery packs: OBNs are equipped with battery packs to power the sensors and storage systems for extended periods, often several weeks or months.
4. A/D converter: to convert the analog signal to digital signal using, for example, Delta-Sigma technology (24 bits resolution, 124 dB instantaneous dynamic range).
4. Positioning Equipment: To accurately correlate the seismic data with specific locations on the seabed, nodes are equipped with positioning equipment such as acoustic transponders or transceivers that can communicate with surface ships or buoys.
5. High accuracy clock: this is required for node synchronization, accurate timing of recorded data and data integration (from multiple nodes).
6. Pressure Cases: All the internal components are housed in pressure-resistant cases to withstand the extreme conditions at the ocean floor, including high pressures and low temperatures.
7. Release Mechanisms: Many OBNs have a mechanism that allows them to be released from the seabed to float back to the surface for retrieval. This might include a corrosion-based release or an acoustic command that triggers the release.

Land Nodes typically incorporate the following components:
1. Seismic sensors: three geophones that are oriented in three directions: X, Y, Z.
2. Data storage: typically solid state memory (e.g., 32 or 64 GB).
3. Battery packs: OBNs are equipped with battery packs to power the sensors and storage systems for extended periods, often several weeks or months.
4. A/D converter: to convert the analog signal to digital signal using, for example, Delta-Sigma technology (24 bits resolution, 124 dB instantaneous dynamic range).
5. Positioning Equipment: GPS receiver and GLONASS receiver to provide high accuracy positioning and high accuracy time information.

In this application a new type of Ocean Bottom Node is described wherein the new Ocean Bottom Node is equipped with muon detectors-MOBN (FIG. 1), and a new type of Land Node that is equipped with a muon detector-MLN (FIG. 2).

DETAILED DESCRIPTION

Figure 1:
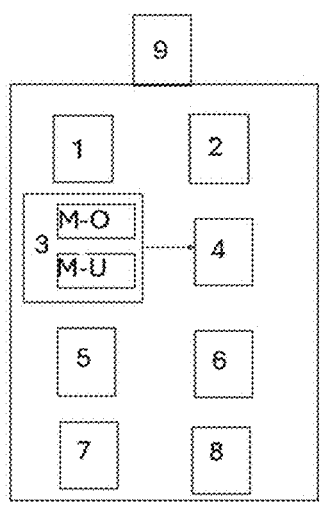
FIG. 1 shows a representative MOBN, an OBN instruments equipped with a Dual Over-Under detector.

The muon are subatomic particles created in Earth's atmosphere when cosmic rays collide with atoms in Erath's atmosphere. These particles are very heavy and could penetrate deep into the earth. As muons pass through subsurface materials, they lose energy, and their trajectories can be deflected (scattered) based on the density and composition of the material. Higher-density materials absorb more muons resulting in fewer muons reaching the detectors at the surface. Lower-density materials allow more muons to pass through with less energy loss (less attenuation), resulting in a higher flux of muons reaching the detector. In addition to energy loss, the muons are also deflected (scattered) by interactions with atomic nuclei. The scattering of the muons affects the trajectory of the muons towards the surface.

Muon tomography relies on the principle that muons interact with matter as they pass through it, and the degree of interaction is primarily determined by the density of the material. It has been discovered that muon tomography may be used to capture very valuable information about the structure of the earth based on density. This is possible if muon detectors are placed at the surface of the earth and/or inside the earth.

A muon detector is a scientific instrument designed to detect muons and operates by tracking the path of muons as they pass through the detector. There are different types of muon detectors. It has been discovered that Scintillator-Based detector and/or Silicon Photomultiplier (SIPMs) detectors can be incorporated into OBN and/or Land Node due to their compact size and lower energy requirements. Other types of muon detectors can also be used in the systems and methods described here as these additional muon detectors are produced.

Scintillator-Based Detectors: These detectors use materials that emit light when struck by a muon. The light is then detected by a plurality of photomultiplier tubes or silicon photomultipliers. Scintillator detectors can be made to be relatively compact and robust so that they can be integrated into a confined space of an OBN and/or Land Node as described herein. Scintillator-based detectors may also have the advantage of being efficient in terms of energy consumption.

Silicon Photomultipliers (SiPMs): A Silicon Photomultiplier is a highly sensitive semiconductor photodetector that is used to detect low level of light. This technology offers high efficiency and low voltage operation, which is ideal for battery-operated devices like OBN or Land Node.

A challenge in muon tomography is the detection of direction of arrivals of the muon at the detectors, as the muons could arrive from above, from below or horizontally. It has been discovered that including seismic instruments with two muon detectors in an Over-Under configuration is useful to discriminate between muons coming from different directions. Such configurations can be useful in, for example, Ocean Bottom Nodes and/or Land Nodes.

In an exemplary configuration two muon detectors may be on top of each other separated by a certain distance. Such configurations are shown in, for example, FIG. 1 and FIG. 2. In some embodiments, the distance of separation of the Over and Under muon detectors is selected such that it is near the maximum or the maximum permitted based on the size of the nodes . . .

FIG. 1 specifically shows a configuration comprising one or more of the following components listed by reference numeral on FIG. 1 which components are enclosed in a pressure-resistant housing in FIG. 1:
  1. 3C component geophones (three geophones wherein one is oriented to receive in an X direction, one is oriented to receive in a Y direction, and one is oriented to receive in a Z direction).
  2. Hydrophone.
  3. Dual Over-Under muon detector (M-O is over muon detector and M-U is under muon detector)—each muon detector can be a scintillator-based detector or a silicon photomultiplier detector.
  4. IMC-Integrator Muon Counter.
  5. Battery pack.
  6. A/D converter for seismic data.
  7. Data storage.
  8. Positioning device (acoustic transponder). Note that only shallow water OBN are usually equipped with acoustic transponders.
  9. Retrieval release mechanism.

As one of skill will appreciate, depending upon the desired application and detection required, some of the above-mentioned components may not be needed or could be substituted with other components. Also, additional components or other components than those listed in FIG. 1 may also be employed.

Figure 2:
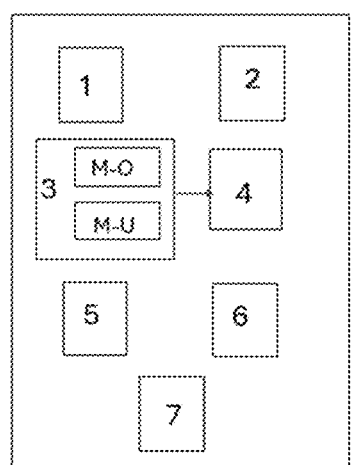
FIG. 2 shows a representative MLN, a Land Node instruments equipped with a Dual Over-Under detector.

FIG. 2 shows the components of an OBN node equipped with a dual Over-Under muon detector which OBN node comprises one or more of the following components listed by reference numeral on FIG. 2:
  1. 3C component geophones (three geophones wherein one is oriented to receive in an X direction, one is oriented to receive in a Y direction, and one is oriented to receive in a Z direction).
  2. Battery pack with an optional clock.
  3. Dual Over-Under muon detector (M-O is over muon detector and M-U is under muon detector)—each muon detector can be a scintillator-based detector or a silicon photomultiplier detector.
  4. IMC Integrator Muon Counter.
  5. A/D converter for seismic data.
  6. Data storage.
  7. Positioning device (GPS receiver and GLONASS receiver).

The dual Over-Under muon detector (MLN) shown in FIG. 2 may be useful as, for example, a Land Node.

As shown in FIG. 1 and FIG. 2 described above, both an MOBN and an MLN may include an IMC Integrator Muon Counter. The IMC Integrator Muon Counter may be configured to count individual muons and integrate the number of muons over a defined period, dt. This period, dt, defines the sampling rate for the muon data. The integrated number of muons for a period of time may be stored in memory at dt interval.

Figure 3:
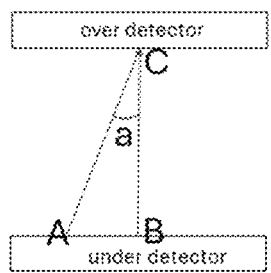
FIG. 3 illustrates how the flux of muons arrival angle could be measured using Over-Under muon detector configuration.

FIG. 3 illustrates how muon arrival angles (i.e., zenith angles) may be detected using Over-Under muon detectors. As shown in FIG. 3 the flux of muons arrival angle 'a' may be measured using the Over-Under muon detector configuration. The arrival angle, also referred to as zenith angle a wherein a=0 degrees means that the flux of muons is coming directly from above and a=90 degrees means that the flux of muons is coming horizontally, i.e., parallel to the ground The vertical separation between Over and Under Muon, BC, is known and the distance AC may be determined by, for example, measuring the time of the arrival of the muon at the A and C points. The vertical separation BC of Over-Under detectors is a function of the size of the nodes. A larger vertical separation between Over and Under detectors may in some embodiments increase the accuracy of arrival angle measurements. AB is the horizontal distance between the muon's impact points on the Over and Under detectors and can be measured or alternatively estimated. The lengths of segments AB, BC and AC may be calculated or estimated, and thus arrival angle 'a', can be determined.

Figure 4:
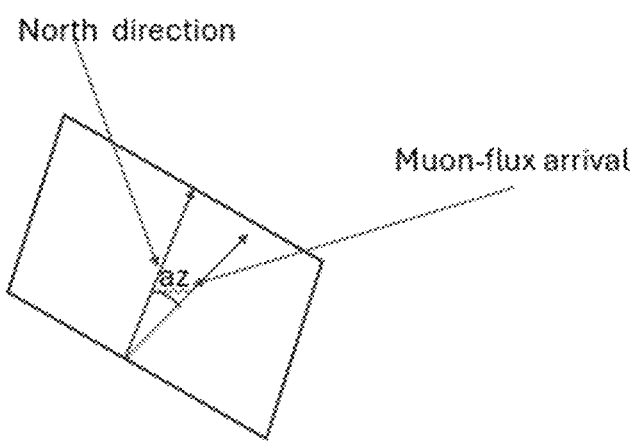
FIG. 4 illustrates how the flux of muons azimuth angle versus North direction could be measured in a horizontal plane.

As shown in FIG. 4, the azimuth arrival angle of the flux of muons may be determined versus North direction in a horizontal plane. That is, in FIG. 4 measuring the flux of muons azimuth arrival angle versus North direction in a horizontal plane; the azimuth angle varies from 0 degrees to 360 degrees; az=0 points towards north, az=90 points toward east, az=180 points toward south, and az=270 points toward west. Having a possibility to measure the azimuth angle in two parallel planes due to the Over and Under detectors increases the accuracy of azimuth angle estimation. The accurate estimation of both the arrival angle and azimuth angle facilitates accurate muon tomography as it has been discovered that each, and their combination, contribute to improving the resolution, accuracy, and/or reliability of muon tomography.

Muon detectors have not previously been employed in over-under configurations as described here. Instead, a muon detector has been placed below the target because the traditional detector, unlike the system here, relies on muons passing through the subsurface and then being measured after traversing the target. It has been discovered that deploying instruments equipped with over-under muon detectors allows for the possibility of placing the detectors above the target. Placing detectors above the target in the systems described here offers one or more up to all of the following advantages:

- Directional discrimination: Over-under detectors can accurately determine whether muons are coming from above (downward-going) or below (upward-going). This allows instruments to be placed above the target while still filtering out a substantial amount up to all muons that are not useful for imaging (e.g., those coming from outside the region of interest). In contrast, detectors without over-under capability are often more vulnerable to noise and spurious signals when placed above the target because they cannot easily distinguish between muons coming from the sky and those passing through the target.
- Better Control Over Muon Path: By measuring muons at multiple points (above and below), over-under detectors provide a more precise understanding of the muons' path. When deployed above the target, this allows the system to focus on muons that have passed through the target and exclude those that have not.
- Bidirectional Sensitivity: Unlike traditional setups, which are limited to detecting muons that have passed upward through the subsurface, over-under detectors as described here can sense muons traveling in both directions. Bidirectional sensitivity often facilitates being able to deploy the detector above the target and still gather useful data about the subsurface structure.
- Ease of deployment: placing the instruments with muon detectors above the target—e.g., on the surface of the earth or on the sea floor—is often much easier and less costly to install, maintain, and/or service than placing them underground.
- Better noise attenuation and filtering: with the Over-Under muon detectors described here it is possible to attenuate at least a portion up to all of the flux of muons coming from above and keep a majority up to all of the flux of muons coming from the underground target.

Figure 5:
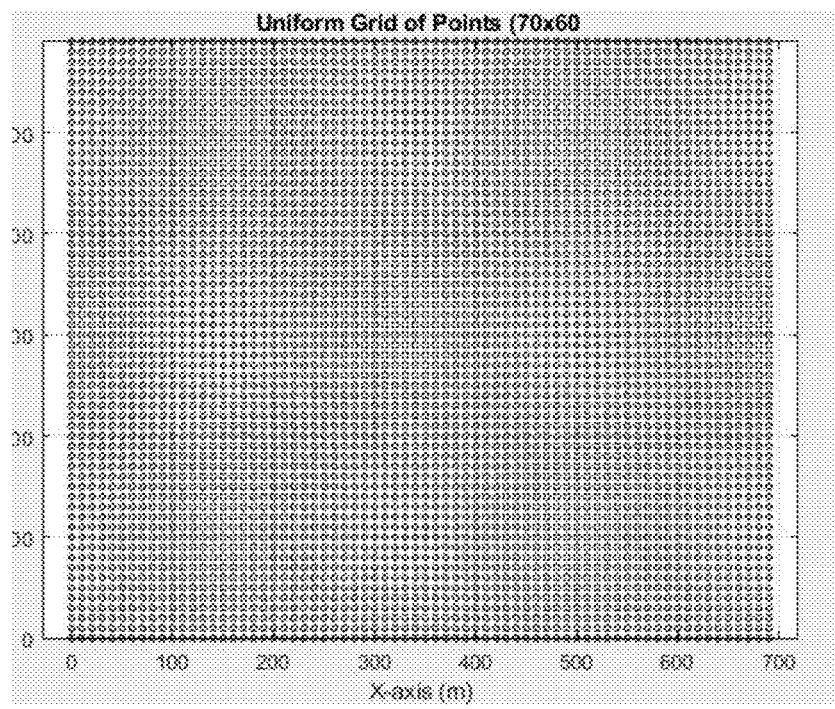
FIG. 5 shows a two-dimensional array of sensors, MOBN or MLN, with a uniform distribution of elements.
Figure 6:
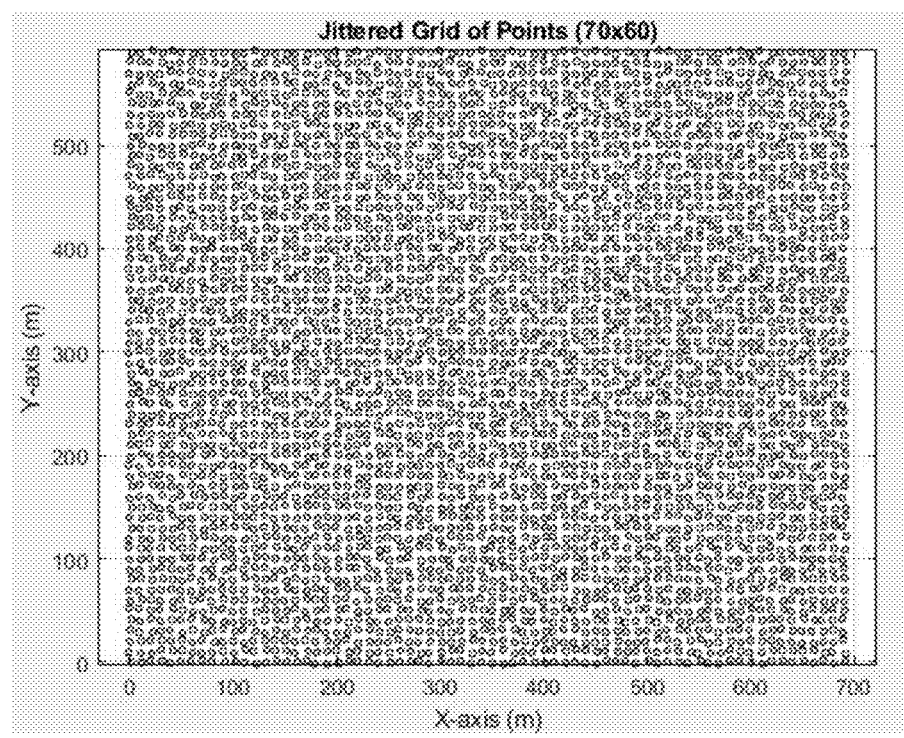
FIG. 6 shows a two-dimensional array of sensors, MOBN or MLN, with a non-uniform ('jittered') distribution of elements.

The deployment of the seismic instruments equipped with muon detectors, MOBN and MLN, may vary depending upon the equipment, the desired application, the environment, desired results, and other factors. In one example, the deployment of the seismic instruments equipped with muon detectors, MOBN and MLN, could be in a two-dimensional array, which allows 3D subsurface exploration. The element distribution inside the 2D array could be with uniform sampling in x- and y-directions (FIG. 5) or could be non-uniform (random) (FIG. 6).

For nonuniform or random distribution the optimization of the element locations may be based on using the Spectral Gap as a cost function as described in, for example, O. Lopez, R. Kumar, N. Moldoveanu: "Spectral Gap-Based Seismic Survey Design", January 2023, *IEEE Transactions on Geoscience and Remote Sensing*, which publication is incorporated herein by reference.

The use of Spectral Gap associated with a matrix defined by element (x,y) locations may allow an accurate reconstruction of the seismic wavefield. One advantage of the 2D array deployment of muon detectors is the recording of flux of muons from different directions and this will typically improve the 3D imaging capabilities.

The instruments equipped with Dual Over-Under muon detectors for extended periods, under the sea (MOBN) or on the surface of the earth (MLN), is a powerful approach to enhance the accuracy of subsurface target estimation. Some of the main benefits of longer time deployment, for example duration of 5 days to 100 days, is increased signal-to-noise ratio of the acquired data and more reliable estimates of the subsurface targets.

The seismic instruments equipped with muon detectors could be used for different applications related to earth subsurface exploration and archeological studies. Subsurface exploration includes, but is not limited to, oil exploration and detection of polymetallic nodules deposited on the sea floor. Such polymetallic nodules may comprise mineral deposits comprising metals like nickel, copper, cobalt, and manganese. Another potential application is exploration of underground water reservoirs.

Benefits for Oil Exploration

Some of the potential benefits of MOBN and/or MLN as described here for oil exploration include, for example:

1) Enhanced subsurface imaging: Muon detectors provide information about density and attenuation properties of the subsurface rocks, which complements the elastic properties measured by seismic methods. This additional data helps the subsurface explorationists to create more detailed and accurate images.
2) Improved resolution: By capturing the scattering and absorption of muons, these nodes can help identify small-scale geological features that might be missed by seismic methods alone, improving the resolution of subsurface models.
3) Better identification of oil reservoirs: The ability to measure density and detect variations within geological formations can help in identifying and characterizing hydrocarbon reservoirs more accurately.
4) MOBN and/or MLN could be used for Carbon Capture and Storage (CCS) to monitor the plume moving in the subsurface reservoirs.
5) Muon acquisition does not require an active source generation, like in seismic, being a non-invasive technique and environmentally friendly; this will allow one to perform continuous type acquisition and to assess the changes in the subsurface that could be caused by the fluid movements and/or fault activation.
6) The muon source sampling is usually very dense and almost constantly available. This is an important advantage versus seismic exploration where a very dense source sampling is often not possible due to the cost and the effect on the environment. The very dense source sampling of the muon source could facilitate compensating for a potentially larger separation between receivers (MOBN or MLN).
7) The MOBN and/or MLN may be deployed in the field for extended periods of time, for example from 40 to 100 days or more, depending on the battery life inside the instrument or other power source used to generate power. Placing muon detectors inside the nodes for extended periods of time (40-100 days or more, depending of the size of then survey) may be beneficial for muon tomography. Since the instruments remain stationary for long durations, the detectors can gather more muon data over time, which improves the signal-to-noise ratio. This longer exposure typically enables better detection and discrimination of muon arrivals, making it easier to differentiate between background noise and genuine signals of interest, such as changes in subsurface density.
8) Tomographic inversion methods may be used to reconstruct density distribution and attenuation in the subsurface. These methods often require accurate determination of the angle of arrival and azimuth angle for the flux muons. Tomographic reconstruction methods will benefit from accurate measurements of the angles with dual Over-Under muon detectors placed inside measurement instruments.
9) Muon tomography provides direct measurements of subsurface density, complementing seismic data that often may be sensitive to elastic properties.
10) Muon tomography offers high resolution imaging of shallow and near surface features; this feature facilitates velocity model building, accurate static corrections, and/or noise attenuation (for example near surface multiples) 11) Joint imaging of seismic data (elastic properties) and muon data could be possible using for example, Full Waveform Inversion (FWI) or Algebraic Reconstruction Methods (ARM). Using both type of subsurface properties in the inversion process could improve the subsurface image.

Benefits for Detection of Polymetallic Nodules Deposited on the Seafloor.

The economic importance of seafloor metallic deposits is becoming important due to the growing global demand for metals. Ocean Bottom Nodes equipped with Over-Under muon detectors (MOBN) could be used to detect variations in the flux of muons related to higher density of the polymetallic nodules containing metals like manganese, copper and cobalt, which have different density compared to the surrounding seafloor sediments. If during a marine oil seismic exploration the Muon Ocean Bottom Nodes (MOBN) are used, both seismic data and muon data are recorded and, as a results of processing and imaging, polymetallic nodules deposits could be mapped (if present) in addition to the information about oil reservoirs (if present). The use of MOBN allow to perform simultaneous acquisition for oil exploration and polymetallic seafloor deposits and reduces the cost of mapping the seafloor metal deposits.

Benefits for Mapping Underground Water Reservoirs

The density contrast between water and surrounding rocks makes muon tomography suited for identifying water reservoirs. Using MLN, land nodes equipped with Over-Under muon detectors enables to do simultaneous acquisition for oil reservoir and underground water reservoir and reduces the cost of finding the water reservoir by using specific geophysical methods (like electrometry) or drilling. This could be particularly useful for seismic surveys using MLN in desert or arid areas.

The aspect of simultaneous acquisition using MOBN for oil exploration and polymetallic survey or simultaneous acquisition using MLN for oil exploration and underground water reservoirs is described above. The MOBN could be used specifically for detection of polymetallic nodules deposited on the seafloor and MLN could be used specifically for detection of underground water reservoirs. In both cases the muon measurements could be used to detect the variations in subsurface density induced by the polymetallic nodules or water reservoirs benefiting of the high resolution capabilities of Over-Under muon detector measurements, as described above.

In addition to the subsurface exploration applications described above, a land muon or an OBN muon equipped with muon detectors as described here could be used also for archeologic studies. (A. Giammanecc et al. "Cosmic rays for imaging cultural heritage objects", 2024 incorporated herein by reference).

Some of the potential benefits for archaeological studies may be similar to seismic exploration described above such as, but not limited to:

Non-invasive technique: Muon tomography doesn't require a source.

Deep penetration: Muons can penetrate hundreds of meters underground, allowing researchers to map underground archeologic structures that might be too deep for traditional geophysical methods.

High resolution: The technique can provide a detailed image of the structure based on variations in material density.

Imaging cultural heritage objects: using portable detectors is possible to investigate large cultural heritage objects, 'in situ', without moving the objects with the associated potential for damage.

EMBODIMENTS

Advantageously, the systems and methods described herein offer one or more of the following:
1) A method of manufacturing seismic instruments that are equipped with muon detectors in an Over-Under configuration that could be used for subsurface exploration. These types of instruments allow to perform simultaneously muon tomography and seismic imaging. Muon tomography is primarily sensitive to density variations in the subsurface. It measures the attenuation and scattering of the cosmic rays as they pass through different rocks allowing to detect accurately changes in density. Seismic imaging is sensitive to elastic properties (such as compressional and shear waves velocities) of subsurface rocks. Density and elastic properties are complementary information that provide a more complete understanding of the subsurface.
2) A method to accurately detect the angle of arrival (zenith angle) of the flux of muon and the direction of the arrivals (azimuth angle versus North direction) of the flux of muons, using instruments equipped with dual Over-Under muon detectors. Accurate determination of angles is critical for muon tomography.
3) A method for subsurface investigations using instruments equipped with Over-Under muon detectors that could be deployed on the surface of the earth (not under the targets); this capability significantly can reduce the cost of the subsurface investigations using muon tomography and increase the signal-to-noise by improved noise filtering capabilities.
4) A subsurface instrument equipped with dual Over-Under muon detectors and an Integrated Muon Counter (IMC) device that counts and integrates the number of muon over a defined period of time, dt (dt is the sampling rate for muon acquisition).
5) A method for 3D simultaneous acquisition of seismic data and muon data using seismic instruments equipped with dual Over-Under muon detectors deployed in a two-dimensional array with uniform distribution of elements (uniform sampling) or non-uniform distribution of elements (random sampling); non-uniform distribution of elements is compatible with compressing sensing design methods, and it will allow an accurate reconstruction of the seismic wavefield.

Figure 7:
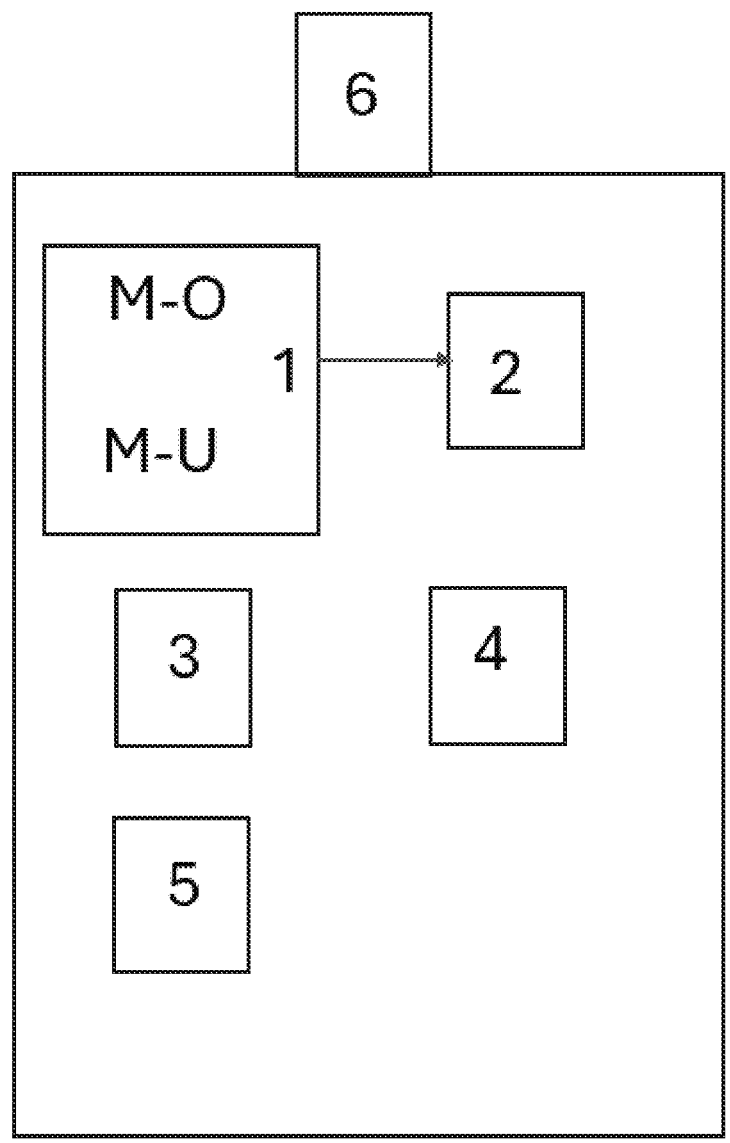
FIG. 7 shows a schematic of an instrument that could be used for a marine environment.
Figure 8:
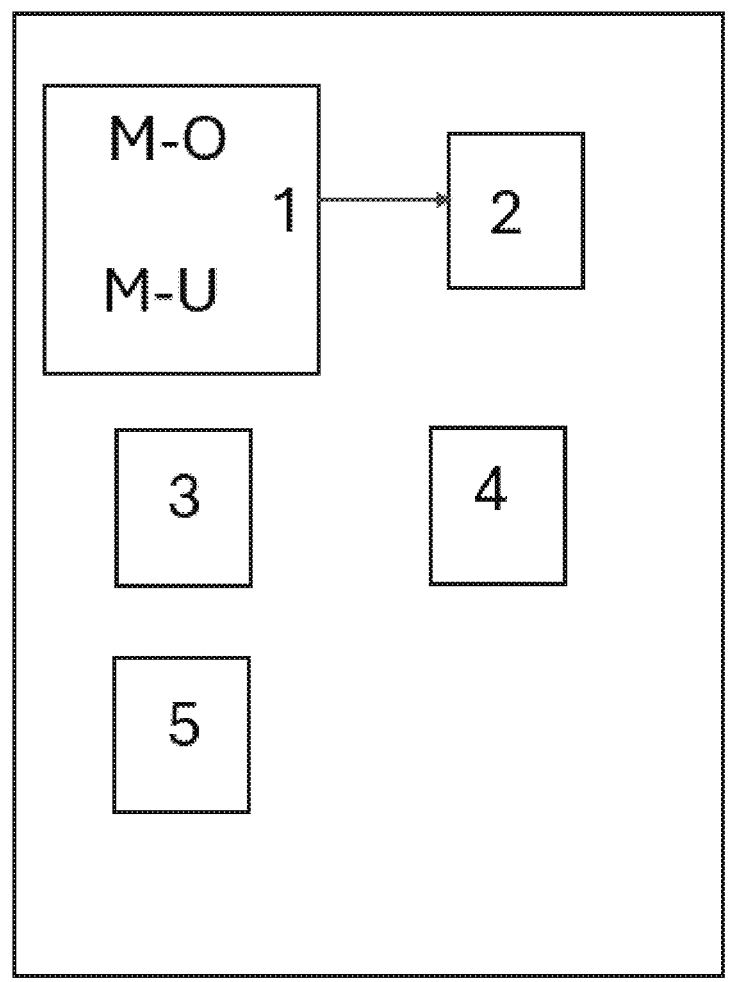
FIG. 8 shows a schematic of an instrument that could be used for a land environment.

6) A survey design method for simultaneous acquisition of seismic data and muon data where the optimization of non-uniform element distribution could use Spectral Gap as a cost function. Spectral Gap is estimated based on the matrix determined by (x,y) array element locations.
7) A survey design method for simultaneous acquisition of seismic data and muon data using MOBN or MLN, which has more flexibility in receiver deployment due to the fact that the source of muons is very densely sampled in space, and it is continuous in time. This could allow to reduce the cost of subsurface investigation by using a reduced number of instruments equipped with Over-Under muon detectors and seismic sensors.
8) Seismic instruments equipped with dual Over-Under configuration (MOBN and MLN) could provide increased signal-noise for muon tomography as these devices could be deployed for extended periods of time at the same location. The integration of muon and seismic data collected for longer duration (depending on the size of the geological targets and the depth of the targets) offers complementary noise reduction and allows for cross-validation of subsurface features, reducing false positives and enhancing imaging accuracy.
9) A simultaneous acquisition method for marine oil exploration and polymetallic seafloor deposit exploration using MOBN instruments.
10) A simultaneous acquisition method for land oil exploration and underground water reservoirs detection using MLN instruments.
11) A method for exploration of seafloor polymetallic nodules using MOBN instruments.
12) A method for exploration of underground water reservoirs using MLN instruments; this could be particularly useful in desert or arid areas and in mountain areas where the use of conventional geophysical methods and drilling are difficult and expensive; the acquisition of MLN data does not require a source.
13) Note: If only muon tomography is planned for subsurface exploration simpler instruments could be used without the seismic sensors and the A/D converter. FIG. 7 shows the schematic of a marine over-under muon detector instrument that could be used for a marine environment with the following: 1. Dual Over-Under muon detector; 2. IMC-Integrator Muon Counter; 3. Battery pack; 4. Data storage; 5. Positioning device (acoustic transponder) Note: only shallow water OBN are equipped with acoustic transponders; and 6. Release mechanism. FIG. 8 shows the schematic of a land over-under muon detector instrument could be used for a land environment: with the following: 1. Dual Over-Under muon detector; 2. IMC-Integrator Muon Counter; 3. Battery pack; 4. Data storage; and 5. Positioning device (GPS receiver and GLONASS receiver).

Specific Embodiments

1. A system for subsurface exploration comprising:
a muon detector array comprising a first muon detector and a second muon detector, wherein the muon detector array is configured to detect muons from above the array, to detect muons below the array, and to detect muons substantially horizontally to the array; and
one or more seismic sensors.

2. The system for subsurface exploration of embodiment 1 wherein the first muon detector and the second muon detector are in an over-under configuration.

3. The system for subsurface exploration of embodiment 1 wherein the over-under configuration comprises the first muon detector being placed vertically above the second muon detector.

4. The system for subsurface exploration of embodiment 3 wherein a vertical distance separates the first muon detector from the second muon detector.

5. The system for subsurface exploration of embodiment 1 wherein the first muon detector is a scintillator-based detector or a silicon photomultiplier detector.

6. The system for subsurface exploration of embodiment 1 wherein the second muon detector is a scintillator-based detector or a silicon photomultiplier detector.

7. The system for subsurface exploration of embodiment 1 wherein the one or more seismic sensors comprise a geophone, a hydrophone, or any combination thereof.

8. The system for subsurface exploration of embodiment 7 wherein the one or more seismic sensors comprise at least three geophones.

9. The system for subsurface exploration of embodiment 8 comprising at least three geophones wherein one geophone is oriented to receive ground vibrations in an X direction, a second geophone is oriented to receive ground vibrations in a Y direction, and a third geophone is oriented to receive ground vibrations in a Z direction.

10. The system for subsurface exploration of embodiment 7 wherein the one or more seismic sensors comprise at least three geophones and at least one hydrophone.

11. The system of embodiment 1 wherein the system is configured to be placed in the ocean and wherein the system further comprises one or more up to all of the following: data storage, a battery pack, an analog signal to digital signal converter, a positioning device, a clock, a pressure-resistant housing, and a retrieval release mechanism.

12. The system of embodiment 1 wherein the system is configured to be placed on land and wherein the system further comprises one or more up to all of the following: data storage, a battery pack, an analog signal to digital signal converter, and a positioning device.

13. The system of embodiment 1 wherein the system further comprises an integrated muon counter.

14. A method for subsurface exploration comprising:
employing a muon detector array comprising a first muon detector and a second muon detector, wherein the muon detector array is configured to detect muons from above the array, to detect muons below the array, and to detect muons substantially horizontally to the array; and
employing one or more seismic sensors;
performing muon tomography with the muon detector array and performing seismic imaging with the one or more seismic sensors to image a subsurface.

15. The method of embodiment 14 which further comprises detecting an angle and a direction of arrival of a flux of muons with the muon detector array.

16. The method of embodiment 14 wherein the wherein the first muon detector and the second muon detector are configured in an over-under configuration on an earth's surface.

17. The method of embodiment 14 wherein the muon tomography and seismic imaging are performed simultaneously.

18. The method of embodiment 14 which further comprises uniformly distributing elements of the muon tomography, the seismic imaging, or both.

19. The method of embodiment 14 which further comprises non-uniformly distributing elements of the muon tomography, the seismic imaging, or both.

20. The method of embodiment 14 which further comprises non-uniformly distributing elements of the seismic imaging to construct a seismic wavefield.

21. The method of embodiment 14 which further comprises optimizing a non-uniform distribution of elements using a spectral gap.

22. The method of embodiment 14 wherein the muon tomography and seismic imaging are performed simultaneously to densely sample muons.

23. The method of embodiment 14 wherein the first muon detector and the second muon detector of the muon detector array are deployed in an over-under configuration at or near the same location for at least a period of time to increase a signal to noise ratio above a muon detector array that is not configured in an over-under configuration.

24. The method of embodiment 14 wherein the method comprises simultaneously performing muon tomography and seismic imaging to explore for seafloor polymetallic deposits and wherein the method comprises employing an MOBN.

25. The method of embodiment 14 wherein the method comprises simultaneously performing muon tomography and seismic imaging to explore for oil reservoirs on land and wherein the method comprises employing an MLN.

26. The method of embodiment 14 wherein the method comprises simultaneously performing muon tomography and seismic imaging to explore for underground water reservoirs and wherein the method comprises employing an MLN.

27. The method of embodiment 14 wherein the method comprises exploring for seafloor polymetallic deposits and wherein the method comprises employing an MOBN.

28. The method of embodiment 14 wherein the method comprises exploring for underground water reservoirs and wherein the method comprises employing an MLN.

29. The method of embodiment 14 wherein the method comprises exploring for underground archeological structures using (1) an MOBN in a marine environment; or (2) an MLN in a land environment.

30. The method of embodiment 14 which further comprises jointly processing data from the muon tomography and the seismic imaging to determine subsurface elastic properties and subsurface density properties and wherein the muon tomography is performed with an MOBN, an MLN, or a combination thereof.

References: The following references are incorporated by reference:
1. Tanaka, H. K. M., Uchida, T., Tanaka, M., Shinohara, H., & Taira, H. (2009). "Cosmic-ray muon imaging of magma in a conduit: Degassing process of Satsuma-Iwojima Volcano, Japan." *Geophysical Research Letters*, 36 (1), L01304. doi:10.1029/2008GL036451
2. Morishima, K., Kuno, M., Nishio, A., Kitagawa, N., Manabe, Y., Moto, M., Takasaki, F., Fujii, H., & Imura, T. (2017). "Discovery of a big void in Khufu's Pyramid by observation of cosmic-ray muons." *Nature*, 552, 386-390. doi:10.1038/nature24647
3. Alessandro Lechmann et all (2021): Muon tomography in geoscientific research-A guide to best practice, Earth-Science Reviews 222 (2021) 103842
4. Nicolae Moldovenu (2005): Vertical source array in marine exploration; Society of Exploration Geophysicists (SEG), Technical Program Expanded Abstracts
5. Reference: A. Giammanecc et al., 2024, "Cosmic rays for imaging cultural heritage objects", ArXiv: 2405.10417v1, physics.soc-ph, 16May2924
6. D. Schouten et al., 2024: Cosmic-ray muon tomography: new Developments for Near-mine Exploration and Geotechnical Applications, Society of Exploration Abstracts, SEG Image Conference, August 2024
7. O. Lopez, R. Kumar, N. Moldoveanu: Spectral Gap-Based Seismic Survey Design, January 2023, IEEE Transactions on Geoscience and Remote Sensing.

The invention claimed is:

1. A system for subsurface exploration comprising:
a node comprising a pressure resistant housing, wherein the pressure resistant housing houses:
a stationary muon detector array comprising a first muon detector and a second muon detector, wherein the muon detector array is configured to detect muons from above the array, to detect muons below the array, and to detect muons substantially horizontally to the array; and
one or more seismic sensors selected from a geophone, a hydrophone, or any combination thereof;
wherein the first muon detector and the second muon detector are in an over-under configuration wherein the over-under configuration comprises the first muon detector being placed vertically above the second muon detector within the pressure resistant housing.

2. The system for subsurface exploration of claim 1 wherein the over-under configuration comprises the first muon detector being placed vertically above the second muon detector and wherein the system measures a muon arrival angle (a) using the equation cos (a)=BC/AC wherein a=arrival angle, BC is a vertical separation between a first muon detector point C on the first muon detector which point C is vertically above a detector point B on the second muon detector, wherein AC is a distance between the first muon detector point C and a detector point A on the second muon detector which point A is different from point B on the second muon detector, and wherein distance AC is determined by measuring the muon's time of arrival at point A on the second muon detector and at point C on the first muon detector.

3. The system for subsurface exploration of claim 2 wherein the system measures a muon azimuth arrival angle in two parallel planes with the first muon detector and second muon detector.

4. The system for subsurface exploration of claim 1 wherein the first muon detector is a scintillator-based detector or a silicon photomultiplier detector.

5. The system for subsurface exploration of claim 1 wherein the second muon detector is a scintillator-based detector or a silicon photomultiplier detector.

6. The system for subsurface exploration of claim 1 wherein the one or more seismic sensors comprise at least three geophones.

7. The system for subsurface exploration of claim 6 comprising at least three geophones wherein one geophone is oriented to receive ground vibrations in an X direction, a second geophone is oriented to receive ground vibrations in a Y direction, and a third geophone is oriented to receive ground vibrations in a Z direction.

8. The system for subsurface exploration of claim 1 wherein the one or more seismic sensors comprise at least three geophones and at least one hydrophone.

9. The system of claim 1 wherein the system is configured to be placed in the ocean and wherein the system further comprises one or more up to all of the following: data storage, a battery pack, an analog signal to digital signal converter, a positioning device, a clock, and a retrieval release mechanism.

10. The system of claim 1 wherein the system is configured to be placed on land and wherein the system further comprises one or more up to all of the following: data storage, a battery pack, an analog signal to digital signal converter, and a positioning device.

11. The system of claim 1 wherein the system further comprises an integrated muon counter.

12. A method for subsurface exploration comprising:
employing a stationary muon detector array comprising a first muon detector and a second muon detector in an over-under configuration wherein the over-under configuration comprises the first muon detector being placed vertically above the second muon detector, wherein the muon detector array is configured to detect muons from above the array, to detect muons below the array, and to detect muons substantially horizontally to the array; and
employing one or more seismic sensors;
performing muon tomography with the stationary muon detector array to obtain muon data and performing seismic imaging with the one or more seismic sensors to obtain seismic data; and
processing the muon data and seismic data together using full waveform inversion or algebraic reconstruction to image the subsurface;
wherein the method directly measures a muon arrival angle (a).

13. The method of claim 12 which further comprises integrating muon data and seismic data to enhance imaging accuracy.

14. The method of claim 13 wherein the wherein the first muon detector and the second muon detector are on an earth's surface and wherein the method further comprises measuring a muon arrival angle (a) using the equation cos (a)=BC/AC wherein a=arrival angle, BC is a vertical separation between a first muon detector point C on the first muon detector which point C is vertically above a detector point B on the second muon detector, wherein AC is a distance between the first muon detector point C and a detector point A on the second muon detector which point A is different from point B on the second muon detector, and wherein distance AC is determined by measuring the muon's time of arrival at point A on the second muon detector and at point C on the first muon detector.

15. The method of claim 14 which further comprises measuring a muon azimuth arrival angle in two parallel planes with the first muon detector and second muon detector.

16. The method of claim 13 wherein the muon tomography and seismic imaging are performed simultaneously.

17. The method of claim 13 wherein the performing comprises uniform sampling of muon data, seismic data, or both.

18. The method of claim 13 wherein the performing comprises non-uniform sampling of muon data, seismic data, or both.

19. The method of claim 13 wherein the performing comprises non-uniform sampling of seismic data to construct a seismic wavefield.

20. The method of claim 13 which further comprises using a spectral gap.

21. The method of claim 13 wherein the muon tomography and seismic imaging are performed simultaneously.

22. The method of claim 13 wherein the first muon detector and the second muon detector of the muon detector array are deployed in an over-under configuration at or near the same location for at least a period of time to increase a signal to noise ratio above a muon detector array that is not configured in an over-under configuration.

23. The method of claim 13 wherein the method comprises simultaneously performing muon tomography and seismic imaging to explore for seafloor polymetallic deposits and wherein the method comprises employing a Muon Ocean Bottom Node.

24. The method of claim 13 wherein the method comprises simultaneously performing muon tomography and seismic imaging to explore for oil reservoirs on land and wherein the method comprises employing a Muon Land Node.

25. The method of claim 13 wherein the method comprises simultaneously performing muon tomography and seismic imaging to explore for underground water reservoirs and wherein the method comprises employing a Muon Land Node.

26. The method of claim 13 wherein the method comprises exploring for seafloor polymetallic deposits and wherein the method comprises employing a Muon Ocean Bottom Node.

27. The method of claim 13 wherein the method comprises exploring for underground water reservoirs and wherein the method comprises employing a Muon Land Node.

28. The method of claim 13 wherein the method comprises exploring for underground archeological structures using (1) an MOBN in a marine environment; or (2) a Muon Land Node in a land environment.

29. The method of claim 13 which further comprises jointly processing data from the muon tomography and the seismic imaging to determine subsurface elastic properties and subsurface density properties and wherein the muon tomography is performed with a Muon Ocean Bottom Node, a Muon Land Node, or a combination thereof.

30. The system of claim 1 wherein the system integrates muon data and seismic data to enhance imaging accuracy.

31. The method of claim 13 wherein the performing is conducted for at least 40 days and wherein the method further comprises exploring for oil, gas, water, or metallic deposits.

* * * * *